(12) United States Patent
Ge et al.

(10) Patent No.: US 11,162,901 B2
(45) Date of Patent: Nov. 2, 2021

(54) SURFACE ENHANCED RAMAN SCATTERING NANO FINGER HEATING

(71) Applicant: Hewlett-Packard Development Company, L.P., Houston, TX (US)

(72) Inventors: Ning Ge, Palo Alto, CA (US); Anita Rogacs, San Diego, CA (US); Viktor Shkolnikov, Palo Alto, CA (US); Alexander Govyadinov, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 671 days.

(21) Appl. No.: 16/074,298

(22) PCT Filed: Apr. 20, 2016

(86) PCT No.: PCT/US2016/028478
§ 371 (c)(1),
(2) Date: Jul. 31, 2018

(87) PCT Pub. No.: WO2017/184134
PCT Pub. Date: Oct. 26, 2017

(65) Prior Publication Data
US 2021/0190694 A1    Jun. 24, 2021

(51) Int. Cl.
*G01N 21/65* (2006.01)
*G01N 21/03* (2006.01)
(Continued)

(52) U.S. Cl.
CPC ....... *G01N 21/658* (2013.01); *G01N 21/0332* (2013.01); *B82Y 15/00* (2013.01); *B82Y 40/00* (2013.01)

(58) Field of Classification Search
CPC .. G01N 21/658; G01N 21/0332; B82Y 15/00; B82Y 40/00
See application file for complete search history.

(56) References Cited

U.S. PATENT DOCUMENTS 6,524,532 B1 *  2/2003  Northrup ............. B01J 19/0046
422/52
7,929,133 B2    4/2011  Wang et al.
(Continued)

FOREIGN PATENT DOCUMENTS

CN    101024483    8/2007
CN    101360681    2/2009
(Continued)

OTHER PUBLICATIONS

White, I. M.; "Optofluidic SERS on Inkjet-fabricated Paper-based Substrates"; Univ. of Maryland, College Park (USA); Feb. 9, 2012.

*Primary Examiner* — Dominic J Bologna
(74) *Attorney, Agent, or Firm* — Hsuanyeh Law Group PC

(57) ABSTRACT

A surface enhanced Raman scattering (SERS) sensor may include a substrate, an electrically conductive layer having a first portion spaced from a second portion by a gap, an electrically resistive layer in contact with and extending between the first portion and the second portion of the electrically conductive layer to form an electrically resistive bridge across the gap that heats the nano fingers in response to electrical current flowing across the bridge from the first portion to the second portion and nano fingers extending upward from the bridge.

20 Claims, 3 Drawing Sheets

(51) Int. Cl.
    *B82Y 40/00*        (2011.01)
    *B82Y 15/00*        (2011.01)

(56) References Cited

U.S. PATENT DOCUMENTS

| | | | |
|---|---|---|---|
| 8,994,937 | B2 | 3/2015 | Mourey et al. |
| 2007/0263696 | A1 | 11/2007 | Kjoller et al. |
| 2007/0285657 | A1 | 12/2007 | Wang et al. |
| 2011/0212512 | A1* | 9/2011 | Wang .................. G01N 21/658 |
| | | | 435/288.7 |
| 2011/0310182 | A1* | 12/2011 | Mardilovich .......... B41J 2/1603 |
| | | | 347/56 |
| 2012/0113420 | A1 | 5/2012 | Kuo et al. |
| 2012/0300203 | A1 | 11/2012 | Tyagi et al. |
| 2013/0107254 | A1 | 5/2013 | Yu et al. |
| 2014/0024131 | A1* | 1/2014 | Kim ....................... G01N 21/00 |
| | | | 436/172 |
| 2014/0204131 | A1* | 7/2014 | Chen ..................... G09G 3/3406 |
| | | | 345/691 |
| 2015/0116706 | A1* | 4/2015 | Barcelo ................. B82Y 15/00 |
| | | | 356/301 |
| 2016/0025635 | A1 | 1/2016 | Li et al. |
| 2019/0154587 | A1* | 5/2019 | Ge ........................ G01N 21/658 |
| 2020/0088675 | A1* | 3/2020 | Mohanty ............ G01N 27/4146 |

FOREIGN PATENT DOCUMENTS

| | | | |
|---|---|---|---|
| CN | 102333656 A | 1/2012 | |
| CN | 103534577 | 1/2014 | |
| CN | 104568896 A | 4/2015 | |
| TW | 201346244 | 11/2013 | |
| WO | WO-2013162514 A1 * | 10/2013 | ........... G01N 21/658 |

* cited by examiner

SURFACE ENHANCED RAMAN SCATTERING NANO FINGER HEATING

BACKGROUND

Surface enhanced Raman scattering (SERS) technology may utilize nano fingers with metal tips to facilitate the sensing of interactions between light impinging an analyte supported by the nano fingers. The analyte is deposited upon the nano fingers by submersing the nano fingers in a liquid that contains analyte and subsequently removing and evaporating the liquid. The sensed interactions may be utilized to identify or analyze the analyte.

SUMMARY

The present disclosure describes a surface enhanced Raman spectrometer (SERS) sensor. The disclosed SERS sensor has an architecture that provides an integral electrically resistive heater below nano fingers to facilitate evaporation of an analyte containing liquid. As a result, the SERS sensor may be more easily fabricated and integrated in a complete analytical chip at a low cost and with less complexity.

The present disclosure describes a method for utilizing a heater to heat an SERS sensor to facilitate closing of the nano fingers and improve performance of the sensor. As will be described hereafter, the heat is applied to the nano fingers to temporally soften the nano fingers during use of the sensor such that the nano fingers more easily bend to facilitate closure of the nano fingers for testing. By facilitating or enhancing closure of the nano fingers, the sensitivity and performance of the sensor may be enhanced.

The present disclosure further describes a method for utilizing a heater to heat a SERS sensor to reduce or remove contaminants from the environment of the nano fingers. As will further be described hereafter, the heat is applied to the nano fingers and surrounding environment to temporarily heat the nano fingers and surrounding environment to degas sensor contamination surfaces prior to testing with the sensor. Because contamination surfaces may be degassed or otherwise heated to remove the contaminants prior to sensing with the sensor, the nano fingers and surrounding environment surfaces may be formed from a larger variety of materials without performance degradation of the sensor. The wider range of materials that may be utilized to form the sensor may lower the cost and complexity of the sensor or enhance its sensitivity or performance.

DETAILED DESCRIPTION

Figure 1:
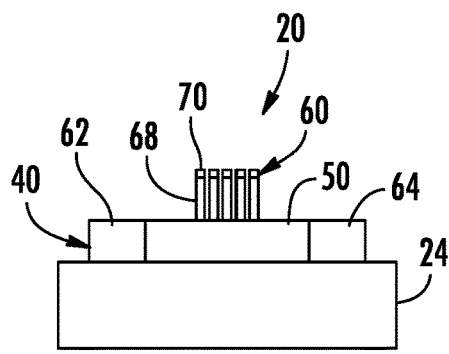
FIG. 1 is a schematic diagram of an example SERS sensor.

FIG. 1 schematically illustrates an example SERS sensor 20. Sensor 20 has an architecture that provides an integral electrically resistive heater below nano fingers to facilitate evaporation of the analyte containing liquid. As a result, the SERS sensor may be more easily fabricated at a low cost and with less complexity.

Sensor 20 comprises substrate 24, electrically conductive layer 40, electrically resistive layer 50 and nano fingers 60. Substrate 24 comprises a base or foundation for sensor 20. In one implementation, substrate 24 comprises a layer of silicon or a semiconductor-based material like III-IV compound. In another implementation, substrate 24 may comprise a polymer, glass or ceramic material.

Electrically conductive layer 40 comprises a layer of electrically conductive material. Layer 40 comprises a first portion 62 and a second portion 64 spaced from the first portion 62 by a gap. One of portions 62, 64 is to be electrically connected to a source of electrical current while the other of portions 62, 64 is to be electrically connected to ground. In the example illustrated, one of portions 62, 64 is to be electrically connected to a pulse voltage supply while the other of portion 62, 64 is to be electrically connected to ground. In one implementation, electrically conductive portions 62, 64 of electrically conductive layer 40 are formed from a same material. In one implementation, portions 62, 64 are formed from electrically conductive material having an electrical resistance less than or equal to 0.04-0.1 ohm/square. In one implementation, portions 62, 64 formed from an electric conductive material including, but not limited to, Al, AlCu, AlCuSi, Cu, Ti, TiN, Ta, W, Mo, Pt and Au. In one implementation, portions 62, 64 of layer 40 have a thickness of 4000-10000 Angstroms and a sheet resistance of 0.04-0.08 ohms/sq.

Electrically resistive layer 50 comprises an electrically resistive layer in contact with and extending between portion 62 and 64 of layer 40. Electrically resistive layer 50 is formed from a material or multiple materials which conduct electrical current and which emit heat as a result. Electrically resistive layer 50 forms an electrically resistive bridge across the gap between portions 62, 64. Electrical current flows through electrically resistive layer 50 to heat nano fingers 60.

In one implementation, electrically resistive layer 50 is formed from a material and has a thickness so as to emit heat at a rate of at least 10 degrees Celsius per microsecond so as to warm nano fingers 60 and the surfaces about the environment of nano fingers 60 to a temperature of at least 50° C. In one implementation, electrically resistive layer 50 is formed from a material and having a thickness so as to emit heat when conducting electrical current so as to warm nano fingers 60 and the surfaces about the environment of nano fingers 60 to a temperature above a glass transition temperature Tg of the polymer or polymers of nano fingers 60 but less than or equal to the lower of (a) a decomposition temperature of the analyte of interest on such nano fingers 60 and (b) a detachment temperature, the temperature at which the analyte of interest will leave or become detached from the surface of the nano fingers 60. In one implementation, electrically resistive layer 50 has an electrical sheet resistance of at least 30 ohm/square and no greater than 900 ohm/square. In one implementation, electrically resistive layer 50 is formed from TaAl and has a thickness of 950

Angstroms, and a sheet resistance of 30 ohms/sq. Examples of materials from which electrically resistive layer 50 may be formed include, but are not limited to, TaAl, WSiN, TaAiN, TiN TaC, Ta, W, Pt, $RuO_2$, MnOx, $In_2O_3$, $SnO_2$, ITO and ZTO, as well as alloys therof.

Nano fingers 60 comprise a two dimensional array of structures rising up above electrically resistive layer 50. Each nano fingers 60 comprises a bendable stem or pillar 68 supporting a metal ball, cap or tip 70. In one implementation, each metal tip 70 is formed from material that enhances SERS sensitivity, such as gold, silver or copper. In one implementation, each pillar 68 comprises a flexible bendable polymer. In one implementation, each pillar 68 is additionally coated with an inorganic film to inhibit contaminants from being released from the surface of the polymer pillar 68.

In one implementation, the nano fingers 60 may be formed from acrylate monomers and have a high-aspect ratio such that the length is at least two times longer than the shortest width. The nano fingers may have an aspect ratio ranging from 2:1 to 20:1, with the aspect ratio being based on the longest dimension to the shortest dimension. Furthermore, each nano fingers 60 may have a width or diameter between 10 nm to 1 µm. Examples of nano fingers include antennas, pillars nano-wires, poles or rods, flexible columnar or finger-like structures, nano flake structures, mushroom-shaped nano-structures, cone-shaped structures and multi-faceted structures (e.g., pyramids), etc.

During testing with sensor 20, a liquid or solvent containing the analyte to be tested is applied over nano fingers 60. In one implementation, nano fingers 60 are submersed within the liquid. Thereafter, the liquid is withdrawn or removed, leaving a coating of liquid on nano fingers 60. Heat is applied to nano fingers 60 and their surrounding surfaces. In particular, pulses of electrical current are applied to one of portions 62, 64, wherein the electric current is conducted across electrically resistive layer 50 to the other of portion 62, 64, resulting in heat being emitted by the electrically resistive bridge formed by layer 50 underlying nano fingers 60. The heat emitted by electrically resistive layer 50 accelerates the evaporation of the liquid from nano fingers 60 and accelerates closure or bending of the nano fingers 60, drawing tips 70 into close proximity or contact with one another. Laser light or other light is then impinged upon the analyte on nano fingers 60, wherein interactions between the light and the analyte are sensed to identify the analyte or determine characteristics of the analyte.

Figure 2:
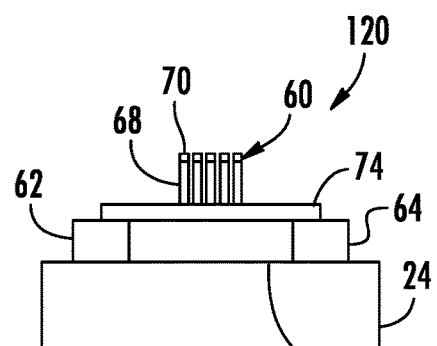
FIG. 2 is a schematic diagram of another example SERS sensor.

FIG. 2 schematically illustrates an example SERS sensor 120. Sensor 120 is similar to sensor 20 except that sensor 120 additionally comprises passivation layer 174. Those remaining elements of sensor 120 which correspond to elements of sensor 20 are numbered similarly.

Passivation layer 174 comprises a layer between the heat emitting electrically resistive layer 50 and nano fingers 60. Passivation layer 174 protects electrically resistive layer 50 from interactions with the analyte containing liquid that is applied to nano fingers 60. Passivation layer 174 may additionally inhibit interactions between the liquid and electrically resistive layer 50 which might otherwise contaminate the solution and analyte being tested. Examples of materials from which passivation layer 174 may be formed include, but are not limited to, SiN, SiC, HfOx, $SiNO_x$, $Al_2O_3$, $Ta_2O_5$ and $SiO_x$. In one implementation, passivation layer 174 has a thickness of at least 1000 Angstroms and no greater than 8000 Angstroms. Operation of sensor 120 is the same as that described above with respect to sensor 20.

Figure 3:
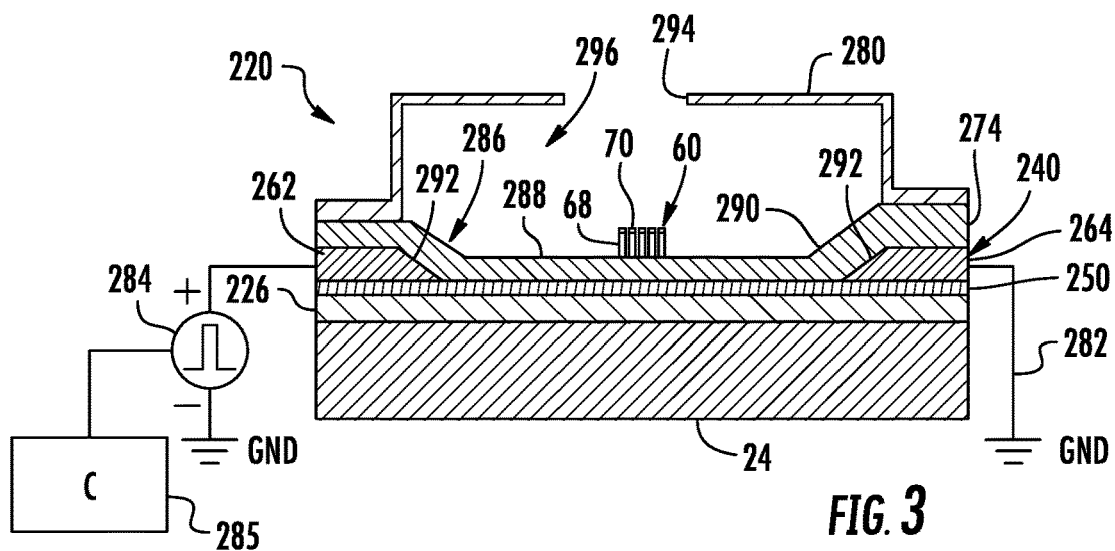
FIG. 3 is a sectional view of another example SERS sensor.

FIG. 3 is a sectional view illustrating an example SERS sensor 220. Sensor 220 comprises substrate 24, interlayer dielectric 226, electrically conductive layer 240, electrically resistive layer 250, passivation layer 274, nano fingers 60, housing 280, ground 282 (schematically shown), pulse voltage supply 284 (schematically shown) and controller 285. Substrate 24 and nano fingers 60 are described above.

Interlayer dielectric 226 comprises a layer of dielectric material sandwiched between substrate 24 and electrically resistive layer 250. Interlayer dielectric 226 electrically insulates electrically resistive layer 250 from substrate 24. In one implementation, interlayer dielectric 226 may comprise a material having a greater electric resistivity as compared to selectively resistive layer 250, such as $SiO_2$ or TEOS. In other implementations, interlayer dielectric 226 may comprise other dielectric materials.

Electrically conductive layer 240 is similar to layer 40 described above except that electric conductive layer 240 is formed on top of electrically resistive layer 250. Electrically conductive layer 240 comprises spaced portions 262 and 264 which conduct electrical current across the underlying electrically resistive layer 250. In the example illustrated, portion 262 of electrically conductive layer 240 is electrically connected to pulse voltage supply 284 on a first side of layer 240 while portion 264 is elected connected to ground 282 on a second side of layer 240.

In the example illustrated, portions 262, 264 are spaced by a gap and cooperate with passivation layer 274 to define and form the shape of a depression or concavity 286 having a floor 288 and sides 290, wherein passivation layer 274 follows the shape formed by the underlying selectively resistive layer 250 and the underlying portions 262, 264. Floor 288 supports nano fingers 60 which rise from floor 288. Sides 290 rise above floor 288. In one implementation, sides 290 rise above floor 288 by a height that is greater than the height of nano fingers 60. The concavity 286 formed by floor 288 and sides 294 serves as a basin for holding the analyte containing solution in which nano fingers 60 are submersed.

In the example illustrated, portions 262, 264 each have a ramp or sloped surface 292 which defines the corresponding sloped sidewall 290 of concavity 288, the interior surface of which is provided by passivation layer 274. The sloped surface of sides 290 provide a larger angle at the junction of floor 288 and side 290 to inhibit capillary retention of liquid within such corners and to facilitate accelerated evaporation of the liquid during testing. In other implementations, surfaces 292 of portion 262, 264 may be linear, concavely curved or stepped.

In one implementation, electrically conductive portions 262, 264 of electrically conductive layer 240 are formed from a same material. In one implementation, portions 262, 264 are formed from an electrically conductive material having an electrical resistance less than or equal to 0.04-0.1 ohm/square. In one implementation, portions 262, 264 formed from an electric conductive material including, but not limited to, Al, AlCu, AlCuSi, Cu, Ti, TiN, Ta, W, Mo, Pt and Au. In one implementation, portions 262, 264 of layer 240 have a thickness of 4000-10000 Angstroms and a sheet resistance of 0.04-0.08 ohms/sq. In one implementation, portions 262, 264 of layer 240 have a thickness of 950 Angstroms and a sheet resistance of 425 ohms/sq.

Electrically resistive layer 250 is similar to electrically resistive layer 50 described above except that layer 250 underlies portion 262, 264 of electrically conductive layer 240 and passivation layer 274. Electrically resistive layer 250 comprises a flat planar layer horizontally extending below in contact with portions 262, 264 as well as passivation layer 274. As with electrically resistive layer 50, electrically resistive layer 250 forms an electrically resistive bridge spanning between portions 262, 264.

In one implementation, electrically resistive layer 250 is formed from a material and having a thickness so as to emit heat at a rate of at least 10° C. per microsecond so as to warm nano fingers 60 and the surfaces about the environment of nano fingers 60 to a temperature above a glass transition temperature Tg of the polymer or polymers of nano fingers 60 but less than or equal to the lower of (a) a decomposition temperature of the analyte of interest on such nano fingers 60 and (b) a detachment temperature, the temperature at which the analyte of interest will leave or become detached from the surface of the nano fingers 60. In one implementation, electrically resistive layer 250 has an electrical sheet resistance of at least 30 ohm/square and no greater than 900 ohm/square. In one implementation, electrically resistive layer 250 is formed from TaAl and has a thickness of 950 Angstroms, and a sheet resistance of 30 ohms/sq. Examples of materials from which electrically resistive layer 250 may be formed include, but are not limited to, TaAl, WSiN, TaAiN, TiN TaC, Ta, W, Pt, $RuO_2$, MnOx, $In_2O_3$, $SnO_2$, ITO and ZTO, as well as alloys therof.

Passivation layer 274 is similar to passivation layer 74 described above except that passivation layer 274 overlies and takes the shape of the underlying electrically resistive layer 250 and portions 262, 264 of electrically conductive layer 240 to form the above described concavity 286. Passivation layer 274 protects electrically resistive layer 250 from interactions with the analyte containing liquid that is applied to nano fingers 60. Passivation layer 274 may additionally inhibit interactions between the liquid and electrically resistive layer 250 which might otherwise contaminate the solution and analyte being tested. Examples of materials from which passivation layer 274 may be formed include, but are not limited to, SiN, SiC, HfOx $SiNO_x$, $Al_2O_3$, $Ta_2O_5$ and $SiO_x$. In one implementation, passivation layer 274 has a thickness of at least 1000 Angstroms and no greater than 8000 Angstroms.

Housing 280 comprises a lid, top or cover structure secured to passivation layer 274 over concavity 286 and over nano fingers 60 to form an enclosure having an interior volume for receiving and containing an analyte containing liquid. In one implementation, walls of housing 280 have a metal or metal alloy interior surface, such as a surface of nickel, gold, platinum, palladium or rhodium, or alloys thereof. In other implementations, the walls of housing 280 may be formed from other materials. In other implementations, walls of housing 280 may alternatively be secured to other portions of sensor 280, rather than upon passivation layer 274.

In one implementation, housing 280 comprises a fill opening 294 through which a liquid containing analyte may be deposited into chamber 296 formed by housing 280. In one implementation, the fill opening is closed by a removable seal that may be peeled away, punctured or torn to expose the fill opening 294. In one implementation, fill opening 294 is formed by peeling, puncturing or penetrating through a portion of the walls of housing 280. In one implementation, portions of housing 280 are perforated or otherwise weekend so as to be torn away or peeled away to form the fill opening 294 of housing 280. In another implementation, housing 280 has a portion which is to be punctured. In yet another implementation, housing 280 comprises a septum through which a needle is used to deposit the analyte containing liquid into the interior of chamber 296.

Ground 282 is electrically connected to portion 264. Pulse voltage supply 284 is electrically connected to portion 262. Controller 285 comprises a processing unit that controls the output of pulse voltage supply 284. In some implementations, controller 285 may control other devices or operations of sensor 220 as well.

For purposes of this application, the term "processing unit" shall mean a presently developed or future developed computing electronics or hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 285 may be embodied as part of one or more application-specific integrated circuits (ASICs). Unless otherwise specifically noted, the controller is not limited to any specific combination of hardware circuitry and software, nor to any particular source for the instructions executed by the processing unit.

As described above, use of sensor 220 involves the application of an analyte containing liquid to nano fingers 60 followed by the removal of such liquid. Remaining analyte containing liquid on nano fingers 60 is evaporated which causes nano fingers 60 to bend and close towards one another to facilitate the sensing of interactions of light with the analyte on nano fingers 60. To assist in the evaporation of the liquid analyte, controller 285 outputs control signals causing pulse voltage supply 284 to supply pulses of electric current to the electrode provided by portion 262 of electrically conductive layer 240. The electrical current is conducted across electrically resistive portion 274 to portion 262 and to ground 282. As electric current is conducted across electrically resistive layer 250 between portions 262 and 264, heat is generated and passed through passivation layer 274 to heat nano fingers 60 in the interior of chamber 296. In one implementation, heat is applied so as to warm nano fingers 60 and interior chamber 296 to a temperature above the glass transition temperature Tg of the polymer material for the nano fingers 60 but less than or equal to the lower of (a) a decomposition temperature of the analyte of interest on such nano fingers 60 and (b) a detachment temperature, the temperature at which the analyte of interest will leave or become detached from the surface of the nano fingers 60. In other implementations, other heating profiles may be a provided by controller 285 through the application of electrical pulses by source 284.

Figure 4:
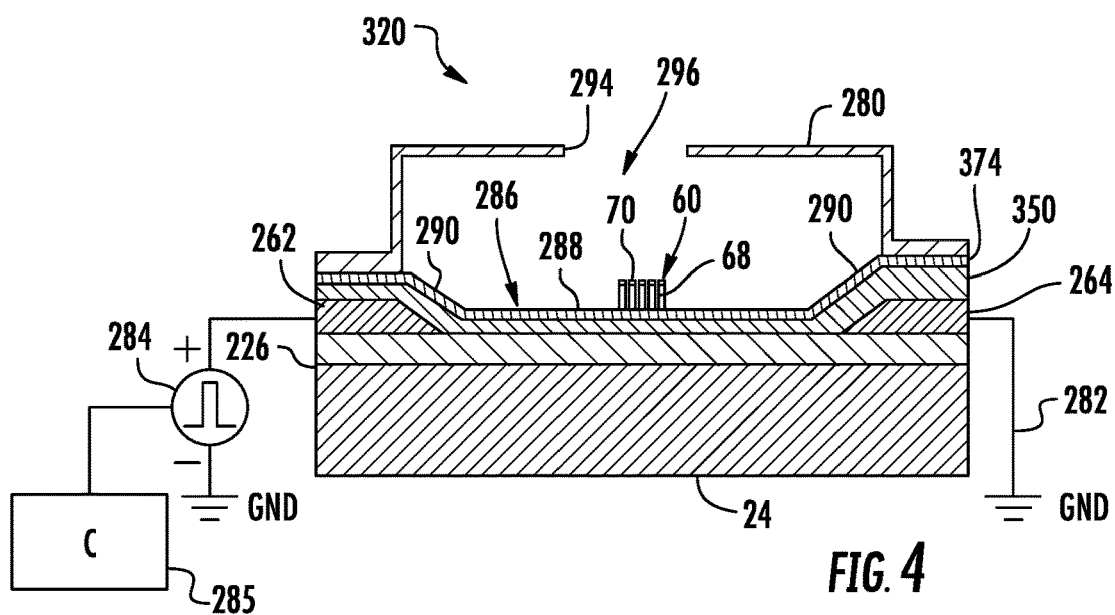
FIG. 4 is a sectional view of another example SERS sensor.

FIG. 4 is a sectional view illustrating of an example SERS sensor 320. Sensor 320 is similar to sensor 220 except that sensor 320 comprises electrically resistive layer 350 and passivation layer 274 in place of electrically resistive layer 250 and passivation layer 274 described above. Those elements of sensor 320 which correspond to elements of sensor 220 are numbered similarly.

Electrically resistive layer 350 is similar to electrically resistive layer 250 except that electrically resistive layer 350 overlies portions 262, 264 of electrically conductive layer 240 and interlayer dielectric 226. In contrast to electrically resistive layer 250 which is a flat planar layer, layer 350 takes the shape of the underlying dielectric layer 226 and portions 262, 264 of electrically conductive layer 240 to form the above described concavity 286.

Passivation layer 374 is similar to passivation layer 274 except that passivation layer 374 overlies selectively resistive layer 350 along an entire length and is separated from portion 262, 264 by electrically resistive layer 350. In other implementations, passivation layer 374 may terminate prior to extending beneath the walls of housing 280.

The use of sensor 320 is similar to the use of sensor 220 described above. Analyte containing liquid is applied to nano fingers 60 followed by the removal of such liquid. Remaining analyte containing liquid on nano fingers 60 is evaporated as the cause nano fingers 60 to bend and close towards one another to facilitate the sensing of interactions of light with the analyte on nano fingers 60.

To assist in the evaporation of the liquid analyte, controller 285 outputs control signals causing pulse voltage supply 284 to supply pulses of electric current to the electrode provided by portion 262 of electrically conductive layer 240. The electrical current is conducted across electrically resistive layer 250 to portion 262 and to ground 282. As electric current is conducted across electrically resistive layer 250 between portions 262 and 264, heat is generated and passed through passivation layer 274 to heat nano fingers 60 in the interior of chamber 296. In one implementation, heat is applied so as to warm nano fingers 60 and interior chamber 296 to a temperature that exceeds the glass transition temperature of the polymer or polymers of nano fingers 60, but which is less than or equal to the lower of (a) a decomposition temperature of the analyte of interest on such nano fingers 60 and (b) a detachment temperature, the temperature at which the analyte of interest will leave or become detached from the surface of the nano fingers 60. In other implementations, other heating profiles may be a provided by controller 285 through the application of electrical pulses by source 284.

Figure 5:
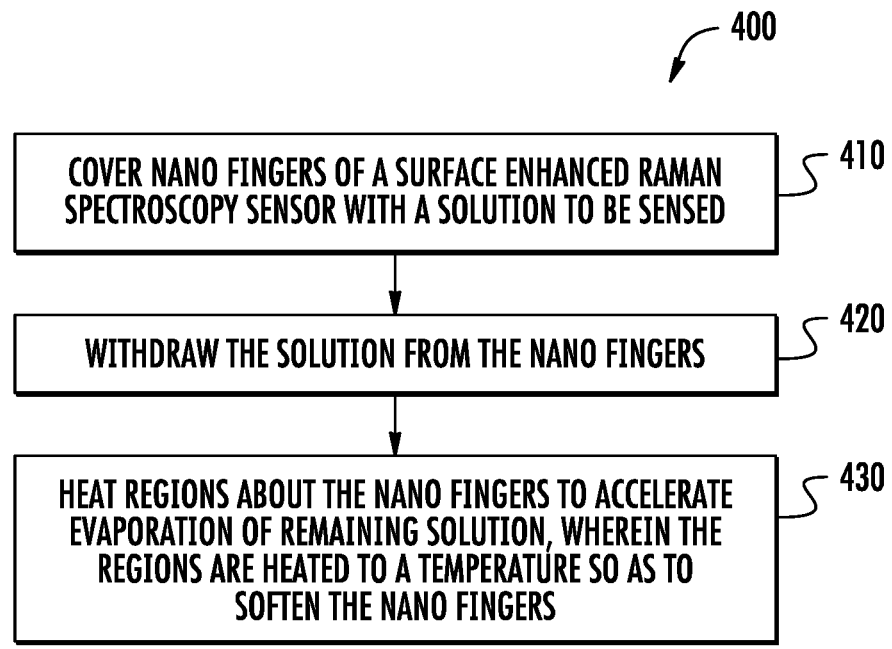
FIG. 5 is a flow diagram of an example method for sensing with an SERS sensor.
Figure 6:
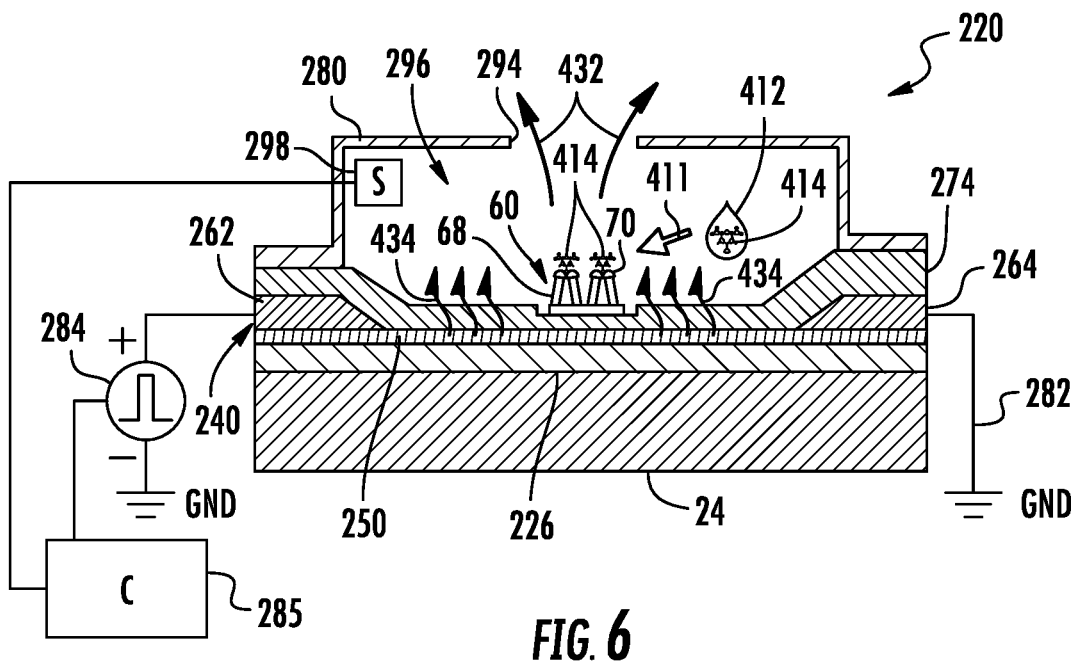
FIG. 6 is a sectional view of the sensor of FIG. 3 carrying out the method of FIG. 5.

FIGS. 5 and 6 illustrate an example method 400 for utilizing a heater to heat an SERS sensor to facilitate closing of the nano fingers and improve performance of the sensor. As will be described hereafter, the heat is applied to the nano fingers to temporarily soften the nano fingers during use of the sensor such that they more easily bend to facilitate closure of the nano fingers for testing. By facilitating or enhancing closure of the nano fingers, the sensitivity and performance of the sensor may be enhanced. Although method 400 is described and illustrated as being carried out using sensor 220 (described above), in other implementations, method 400 may be carried out using any of the SERS sensors described in this disclosure or other sensors having other heaters or heating architectures that may be actuated to heat the SERS nano fingers.

As indicated by block 410 and identified by the stage identifier (1) in FIG. 6, nano fingers 60 of sensor 220 are covered (as indicated by arrow 411) with a liquid or solution 412 containing an analyte 414 to be sensed. As indicated by block 420 in FIG. 5, the solution for 12 is withdrawn from nano fingers 60. In one implementation, the solution 412 is evacuated from chamber 296 through opening 294, or another opening (not shown), leaving the remaining solution 412 and analyte 414 adhered to or coated upon the surfaces of nano fingers 60 as well as to the other surfaces of chamber 296.

As indicated by block 430 in FIG. 5 and identified by the stage identifier (2A) in FIG. 6, controller 285, following instructions in a non-transitory computer-readable medium, outputs control signals causing pulse voltage supply 284 to supply pulses of electrical current to portion 262 of electrically conductive layer 240. The electrical current is conducted across electrically resistive layer 250 to portion 262 and to ground 282. As electric current is conducted across electrically resistive layer 250 between portions 262 and 264, heat (indicated by arrows 434) is generated and passed through passivation layer 274 to heat nano fingers 60 in the interior of chamber 296. This heat 434 is sufficient to accelerate the evaporation of the remaining solution 412 on nano fingers 60 as indicated by arrows 432. The evaporation of the liquid solution may cause nano fingers 60 to bend or close towards one another, retaining analyte 414 for subsequent sensing.

As further indicated by block 430 in FIG. 5 and illustrated by the stage identifier (2B) in FIG. 6, controller 285 outputs control signals causing pulse voltage supply 284 to supply pulses of electrical current to portion 262 of electrically conductive layer 240 such that a sufficient amount of heat 434 is provided so as to soften or make more pliable the pillars 68 of nano fingers 60. As a result, nano fingers 60 may bend or close more completely or earlier in time to facilitate enhanced sensing or faster sensing.

In one implementation, the softening of pillars 68 by heat 434 is a result of electrical resistive layer 250 converting the electrical energy into heat so as to heat pillars 68 to a temperature above a glass transition temperature Tg of the material or materials of pillars 68. The amount of energy to be applied to soften pillars 68 may be determined by multiplying (a) the specific heat capacity of the material or composition of each pillar 68, (b) the temperature difference between the current temperature and the glass transition temperature multiplied and (c) the amount of material or size of each pillar 68. In one implementation, controller 285 controls the application of pulses of electric currents us to heat pillars 68 to a temperature of at least 80° C. In one implementation, each pillar 68 may be formed from a polymer that may be softened. Examples of materials from which pillars 68 may be formed to facilitate such softening with the application of heat by the heater formed by portions 262, 264 and layer 250 include, but are not limited to, polypropylene, poly-3-hydroxybutyrate, ply(vinyl acetate), polychlorotrifluoroethylene, polyamide (Nylone-6,x), polylactic acid, polyethylene terephthalate, poly(vinyl chloride), poly(vinyl alchohol), polystyrene, Poly(methyl methacrylate), acrylonitrile butadiene styrene (ABS), polycarbonate, epoxy (SU8), negative photoresist and Polydimethylsiloxane (PMDS), or combinations thereof.

In one implementation, controller 285 causes supply 284 to supply electrical current that produce heat and softens pillars 68 so as to facilitate a plastic or elastic the formation of pillars 68 to further facilitate closure of such pillars 68. In one implementation, each pillar 68 is softened to a degree such that each of pillars 68 plastically or elastically deforms to bend and move in a direction towards and adjacent nano finger 60 by a distance of at least one half of the diameter of nano finger 60. In one implementation, controller 285 outputs control signals causing supply 284 to cause supply 284 to provide electrical pulses to portion 262 for a predetermined empirically determined amount of time with predetermined pulse widths and amplitudes so as to soften pillars 68 by a predetermined extent to facilitate bending.

In another implementation, controller 285 may adjust the duration or characteristics of the electrical pulses supplied by supply 284 based upon sensed feedback from at least one sensor, such as an optional sensor 298. For example, in one implementation, sensor 220 may comprise an optical sensor 298. In other implementations, such an optical sensor may be provided by an external device, such as SERS detector and analyzer. In such implementations, the optical sensor senses the bending of nano fingers 60, wherein controller 285 adjusts the duration or characteristics of the electrical pulses supplied by supply 284 based upon the sensed bending of nano fingers 60 during the application of heat. In another implementation, sensor 298 may comprise a temperature sensor which senses the temperature of interior 96, wherein controller 285 adjusts the duration or characteristics of the electrical pulses supplied by supply 284 based upon closed-loop feedback regarding the temperature of interior of chamber 296 or a sensed temperature of other portions of sensor 220.

Figure 7:
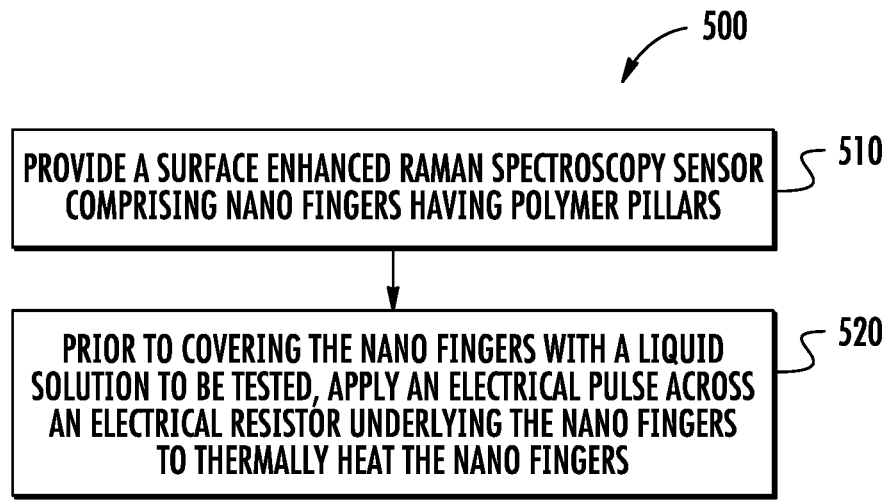
FIG. 7 is a flow diagram of an example method for sensing with an SERS sensor.
Figure 8:
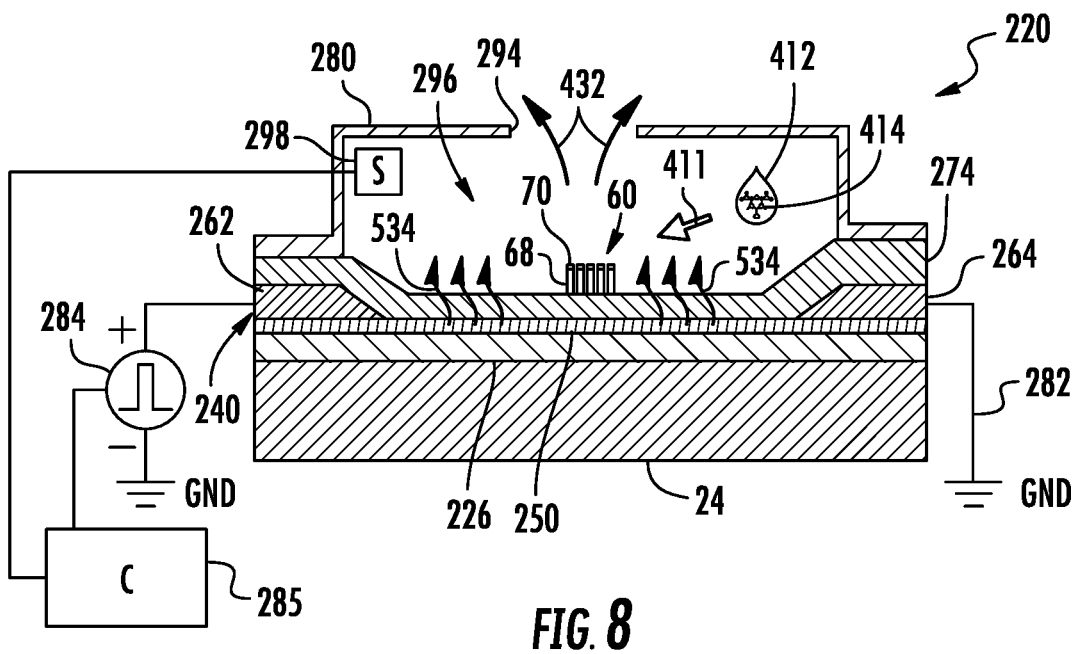
FIG. 8 is a sectional view of the sensor of FIG. 3 carrying out the method of FIG. 7.

FIGS. 7 and 8 illustrate an example method 500 for utilizing a heater to heat an SERS sensor to "pre-clean" the sensor for subsequent use. In the example illustrated, method 500 applies heat to nano fingers 60 and the surrounding surfaces of chamber 296 to reduce or remove contaminants from the environment of the nano fingers 60. In one implementation, the heat is applied to the nano fingers and surrounding environment to temporarily heat the nano fingers and surrounding environment to degas sensor contamination surfaces prior to testing with the sensor 220. Because contamination surfaces may be degassed or otherwise heated to remove the contaminants prior to sensing with the sensor, the nano fingers 60 and surrounding environment surfaces may be formed from a larger variety of materials without performance degradation of the sensor. The wider range of materials that may be utilized to form the sensor may lower the cost and complexity of the sensor or enhance its sensitivity or performance. Although method 500 is described as being carried out using sensor 220 (described above), in other implementations, method 500 may be carried out using any of the SERS sensors described in this disclosure or other sensors having other heaters or heating architectures that may be actuated to heat the SERS nano fingers and surrounding surfaces.

As indicated by block 510 of FIG. 7 and illustrated by FIG. 8, a surface enhanced Raman scattering sensor comprising nano fingers having polymer pillars 60 is provided. As indicated by block 520 and illustrated by stage identifier (1) in FIG. 8, prior to any sensing or prior to the covering of nano fingers 60 with a liquid solution 412, controller 285 outputs control signals causing pulse voltage supply 284 to supply pulses of electrical current to electrically conductive portion 262, wherein the electrical current is conducted across the electrically resistive layer 250. As electric current is conducted across electrically resistive layer 250 between portions 262 and 264, heat 534 is generated and passed through passivation layer 274 to heat nano fingers 60 in the interior of chamber 296. In one implementation, heat is applied so as to warm nano fingers 60 and interior chamber 296 to a temperature sufficient to pre-clean the pillars 68 of nano fingers 70 as well as the surrounding surfaces of chamber 296. In one implementation, controller 285 outputs control signals to pulse voltage supply 284 so as to inject into each molecule of the materials of pillars 68 and the surfaces of chamber 296 and amount of energy that approximates the enthalpy of absorption of the material or materials to facilitate degassing of contaminants and "precleaning".

In one implementation, pillars 68 and the materials forming the interior surfaces of chamber 296 are heated to such a temperature (such that the enthalpy of absorption for the material or materials is attained) for a short duration, for a time limited so as to inhibit significant movement of polymer chains. As a result, contaminants may be removed from the materials without the geometry of nano fingers 60 being altered.

In one implementation, the polymer pillars 68 of nano fingers 60 may be formed from acrylate monomers and/or dimethylsiloxanes and may have a high-aspect ratio such that the length is at least two times longer than the shortest width. The nano fingers 60 may have an aspect ratio ranging from 2:1 to 20:1, with the aspect ratio being based on the longest dimension to the shortest dimension. Furthermore, each nano fingers 60 may have a width or diameter between 10 nm to 1 µm. Examples of nano fingers include antennas, pillars nano-wires, poles or rods, flexible columnar or finger-like structures, nano flake structures, mushroom-shaped nano-structures, cone-shaped structures and multi-faceted structures (e.g., pyramids), etc. In one implementation, the polymer pillars 68 may be formed from acrylate monomers, having a height of 700 nm and a diameter of 70 nm. In one such implementation, each of the nano fingers 60 has a metal tip in the form of a 150 nm diameter ball. In one implementation, pillars 68 and nano fingers 60 are heated to a temperature equal to or greater than at least a detachment temperature of expected or anticipated contaminants and, in one implementation at or above a decomposition temperature of the expected contaminants.

The expected contaminants are those elements or particles that are expected to exist on the nano fingers 60 due to the fabrication environment, sensing environment and the materials of the SERS sensor and surrounding structures, wherein such elements are of a type or density so as to interfere with the sensing by SERS sensor. The detachment temperature is the temperature at which those expected or anticipated contaminants become detached or separated from pillars 68 and/or the surfaces exposed to nano fingers 68. The decomposition temperature is the temperature at which the expected or anticipated contaminants, such as those contaminants resulting from degassing of a polymer that forms pillars 68 or surfaces exposed to nano fingers 68, will decompose.

In one implementation, pillars 68 and nano fingers 60 are heated to a temperature at or above the decomposition temperature or detachment temperature, but less than the temperature at which the nano fingers 68 will deform and change shape or bend and move in directions towards adjacent nano fingers by distance equal to or greater than the diameter of a pillars 68 of individual nano fingers 60. In other implementations, other heating profiles may be a provided by controller 285 through the application of electrical pulses by source 284

In one implementation, such "precleaning" may be performed at the time of manufacture of sensor 220 prior to shipment of sensor 220. In another implementation, such "pre-cleaning" may be carried out by an end-user prior to use of sensor 220. Following such "precleaning", as indicated by the stage identifier (2), solution 412 containing analyte 414 may be applied to nano fingers 60 as indicated by arrow 411. Following the removal or withdrawal of the solution, controller 285 may once again outputs control signals causing pulse voltage supply 284 to applied electrical current across electrically resistive layer 250 is once again heat nano fingers 60 and the interior chamber 296. At this stage, the heat is applied to accelerate the evaporation, as indicated by arrows 432 and stage identifier (3), of any remaining solution 412 coating nano fingers 60. In one implementation, the heat applied by electrically resistive layer 250 may also be sufficient so as to soften nano fingers 60 to further facilitate closing of nano fingers 60 to a greater extent or in a shorter time as described above with respect to method 400 and illustrated in FIG. 6.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced Raman scattering (SERS) sensor comprising:
   a substrate;
   an electrically conductive layer having a first portion spaced from a second portion by a gap;
   an electrically resistive layer in contact with and extending between the first portion and the second portion of the electrically conductive layer to form an electrically resistive bridge across the gap;
   nano fingers extending upward from the bridge, wherein the bridge heats the nano fingers in response to an electrical current flowing across the bridge from the first portion to the second portion;
   a feedback sensor capable of detecting a physical property of or about the nano fingers; and
   a controller configured to adjust characteristics of the electrical current across the electrically resistive bridge based on the physical property detected by the feedback sensor.

2. The sensor of claim 1 further comprising a passivation layer between the electrically resistive bridge and the nano fingers.

3. The sensor of claim 1 further comprising a pulse voltage supply electrically connected to the first portion.

4. The sensor of claim 3, wherein the controller is configured to control the pulse voltage supply so as to supply electrical current across the electrically resistive bridge to heat regions about the nano fingers to a temperature of at least a glass transition temperature of the nano fingers.

5. The sensor of claim 4, wherein the nano fingers each comprise a pillar formed from material that softens in response to reaching a temperature and wherein the controller controls the pulse voltage supply to heat each pillar to the temperature.

6. The sensor of claim 4, wherein the controller is configured to control the pulse voltage supply to pre-clean the nano fingers by applying electrical current across the electrically resistive bridge to heat the nano fingers to a temperature above at least one of (a) a decomposition temperature and (b) a detachment temperature of contaminants on the nano fingers, wherein the decomposition temperature is a temperature at which the contaminants will decompose and wherein the detachment temperature is a temperature at which contaminants become detached or separate from the nano fingers.

7. The sensor of claim 1 further comprising a chamber about the nano fingers to contain the sample fluid, the bridge underlying the chamber.

8. The sensor of claim 7, wherein the bridge underlies a majority of the chamber.

9. The sensor of claim 1, wherein the electrically conductive layer and the electrically resistive layer form a concavity having sides and a floor, wherein the electrically resistive bridge forms the floor.

10. The sensor of claim 9, wherein the electrically resistive layer forms the sides of the concavity.

11. The sensor of claim 9, wherein the first and second portions form the sides of the concavity.

12. The sensor of claim 1, wherein the feedback sensor comprises an optical sensor and the physical property comprises bending of the nano fingers.

13. The sensor of claim 1, wherein the feedback sensor comprises a temperature sensor and the physical property comprises a temperature of regions about the nano fingers.

14. The sensor of claim 1, wherein the characteristics of the electrical current comprises a duration of a pulse current.

15. A method comprising:
   covering nano fingers of a surface enhanced Raman scattering sensor with a solution to be sensed, the polymer fingers formed from a polymer having a glass transition temperature;
   withdrawing the solution from the nano fingers;
   heating regions about the nano fingers in a feedback loop by repetitively detecting a first temperature of the regions and adjusting a heating condition applied to the regions based on the detected first temperatures, so as to heat the regions up to a second temperature and to accelerate evaporation of remaining solution, wherein the second temperature is at least the glass transition temperature so as to soften the nano fingers.

16. The method of claim 15, wherein the regions about the nano figures are heated by applying an electrical current across an electrically resistive bridge underlying the nano fingers and electrically connecting spaced portions of an electrically conductive layer.

17. A method comprising:
   providing a surface enhanced Raman scattering sensor comprising nano fingers having polymer pillars;
   detecting a physical property of the nano fingers;
   adjusting based on the detected physical property an electrical pulse across an electrical resistor underlying the nano fingers to thermally heat the nano fingers from a first temperature to a second temperature; and
   covering the nano fingers with a liquid solution to be tested after the nanofingers are thermally heated to the second temperature.

18. The method of claim 17, wherein the nano fingers are heated to at least one of a decomposition temperature and a detachment temperature of contaminants on the nano fingers, wherein the decomposition temperature is a temperature at which the contaminants will decompose and wherein the detachment temperature is a temperature at which contaminants become detached or separate from the nano fingers.

19. The method of claim 17, wherein the physical property comprises bending of the nano fingers.

20. The method of claim 17, wherein the physical property comprises a temperature of the nano fingers.

* * * * *